(12) United States Patent
Porubanova et al.

(10) Patent No.: US 12,327,501 B2
(45) Date of Patent: Jun. 10, 2025

(54) SYSTEMS AND METHODS FOR FACILITATING DISPLAY MISALIGNMENT CORRECTION BASED ON VERGENCE ANGLE

(71) Applicant: Microsoft Technology Licensing, LLC, Redmond, WA (US)

(72) Inventors: Michaela Porubanova, Seattle, WA (US); Björn Nicolaas Servatius Vlaskamp, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 18/086,868

(22) Filed: Dec. 22, 2022

(65) Prior Publication Data

US 2024/0212535 A1  Jun. 27, 2024

(51) Int. Cl.
*H04N 13/327* (2018.01)
*G09G 3/00* (2006.01)
*H04N 13/332* (2018.01)
*H04N 13/366* (2018.01)

(52) U.S. Cl.
CPC ........... *G09G 3/003* (2013.01); *H04N 13/327* (2018.05); *H04N 13/366* (2018.05); *G09G 2354/00* (2013.01); *H04N 13/332* (2018.05); *H04N 2213/002* (2013.01)

(58) Field of Classification Search
CPC .. G09G 3/003; G09G 2354/00; H04N 13/327; H04N 13/366; H04N 13/332; H04N 2213/002; H04N 13/344; H04N 13/398; H04N 13/383
See application file for complete search history.

(56) References Cited

U.S. PATENT DOCUMENTS

2007/0285663 A1*  12/2007  Hewitt ................. H04N 13/398
                                                                356/399
2008/0024391 A1    1/2008   Oliver et al.
(Continued)

OTHER PUBLICATIONS

International Search Report and Written Opinion received for PCT Application No. PCT/US2023/036975, Apr. 5, 2024, 14 pages.
(Continued)

*Primary Examiner* — Jitesh Patel
(74) *Attorney, Agent, or Firm* — Workman Nydegger (57) ABSTRACT

A system for facilitating binocular vertical display misalignment correction based on vergence angle is configurable to determine a vertical fusional amplitude indicator associated with user operation of a stereoscopic display system, and, based on the vertical fusional amplitude indicator, determine one or more correction application attributes. The one or more correction application attributes indicate a manner of applying one or more display misalignment correction operations to align presentation of content in the stereoscopic display system. The system is also configurable to apply the one or more display misalignment correction operations to align the presentation of the content in the stereoscopic display system in accordance with the one or more correction application attributes, thereby effectuating display misalignment correction in a manner that mitigates user discomfort and/or user experience disruption.

20 Claims, 7 Drawing Sheets

(56) References Cited

U.S. PATENT DOCUMENTS

| | | | |
|---|---|---|---|
| 2012/0218388 A1* | 8/2012 | Kawakami | H04N 13/128 |
| | | | 348/47 |
| 2013/0038510 A1 | 2/2013 | Brin et al. | |
| 2013/0235169 A1 | 9/2013 | Kato et al. | |
| 2014/0375680 A1 | 12/2014 | Ackerman et al. | |
| 2016/0117864 A1 | 4/2016 | Cajigas | |
| 2017/0148206 A1* | 5/2017 | Donner | G06T 7/285 |
| 2019/0043236 A1 | 2/2019 | Jones | |
| 2019/0238818 A1 | 8/2019 | Held | |
| 2021/0181840 A1 | 6/2021 | Vlaskamp | |
| 2021/0397253 A1* | 12/2021 | Kocdemir | G02B 27/0093 |
| 2023/0239456 A1 | 7/2023 | Xiao | |
| 2023/0273444 A1* | 8/2023 | Demaster-Smith | |
| | | | H04N 13/327 |
| | | | 349/11 |
| 2023/0368403 A1* | 11/2023 | Porubanova | H04N 13/344 |
| 2024/0333906 A1 | 10/2024 | Porubanova | |

OTHER PUBLICATIONS

Jin, et al., "Creating a comfortable stereoscopic viewing experience: Effects of viewing distance and field of view on fusional range", Stereoscopic Displays and Virtual Reality Systems XII, vol. 5664, Mar. 22, 2005, pp. 10-21.

Non-Final Office Action mailed on Aug. 27, 2024, in U.S. Appl. No. 18/194,884, 12 pages.

International Search Report and Written Opinion received for PCT Application No. PCT/US2024/021241, Jun. 4, 2024, 14 pages.

Final office action mailed on Feb. 27, 2025, in U.S. Appl. No. 18/194,884, (Ms# 412714-US01) 14 pages.

* cited by examiner

SYSTEMS AND METHODS FOR FACILITATING DISPLAY MISALIGNMENT CORRECTION BASED ON VERGENCE ANGLE

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

MR systems typically include separate display components configured for arrangement in front of separate eyes of a user to facilitate display of content to the user. The separate display components usually display at least partially different images to enable the separate display components to complement one another in facilitating a stereoscopic viewing experience for the user. Human vision systems fuse the different images displayed by the separate display components and perceived by the user's eyes, enabling the user to perceive the displayed content as being positioned at desired depths/locations within a mixed-reality scene.

However, stereoscopic misalignments often occur in MR systems, where content displayed via the separate display components is not properly aligned. Stereoscopic misalignments can result in users perceiving the displayed content in an undesirable manner within the mixed-reality scene. For example, stereoscopic misalignments can cause users to misperceive hologram or virtual object size and/or location in space, which can degrade user experiences (e.g., especially in experiences where users are meant to interact with holograms). In some instances, when display misalignments are large, human vision systems can fail to fuse the different display images, resulting in users experiencing double vision. Stereoscopic misalignments can additionally or alternatively result in visual strain, visual discomfort, and/or vestibular discomfort for users.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are generally directed to systems and methods for facilitating display misalignment correction based on vergence angle (e.g., for mixed reality devices).

Examples of Technical Benefits, Improvements, and Practical Applications

Those skilled in the art will recognize, in view of the present disclosure, that at least some of the disclosed embodiments may be implemented to address various shortcomings associated with at least some conventional approaches for addressing stereoscopic misalignment in display systems. The following section outlines some example improvements and/or practical applications provided by the disclosed embodiments. It will be appreciated, however, that the following are examples only and that the embodiments described herein are in no way limited to the example improvements discussed herein.

As noted above, stereoscopic display misalignments can cause various user experience issues in display systems (e.g., MR HMDs). In some instances, display misalignment is caused by physical and/or thermal deformations, which can arise after production of devices and can change and/or exacerbate over time. Various methods exist for detecting and correcting for display misalignment on display devices in production. However, many existing techniques for addressing display misalignments involve instantly correcting for display misalignments upon detection of such misalignments. Misalignment corrections can manifest to users as a change in the position of holograms/virtual content. Such immediate or abrupt misalignment corrections can be disruptive to user experiences, even though such corrections attempt to remove disruptions to user experiences.

Disclosed embodiments include modifying the attributes of misalignment corrections to be performed based on vergence angle. Vertical fusional amplitudes (i.e., the magnitude of binocular vertical offset/misalignment between two images beyond which fusion of the two images is not attainable in human vision) are contingent on the horizontal vergence angle of the eyes. Horizontal vergence eye movements refer to horizontal rotations of the eyes in opposite directions. When looking at objects at near distances, the eyes rotate inwards. When looking at an object at far distances, the eyes rotate outwards. The vergence angle refers to the angle between the lines of sight of the two eyes at the point where they intersect in space (e.g., on the object of focus). Large vergence angles are associated with eye fixation on objects at closer distances. Importantly, vertical fusional amplitudes/ranges are also larger for eye fixation on near objects (e.g., for large vergence angles) than for eye fixation on far objects (e.g., for small vergence angles).

At least some disclosed embodiments leverage this coupling of vergence angle and vertical fusional range to provide vertical display misalignment correction methods that consider convergence angles between user eyes and virtual objects. The vergence angle may be estimated using an eye tracker, based on the location of virtual objects in the space, and/or in other ways. The vergence angle information about the distance at which the user is looking can be used to determine when and/or how to correct for binocular vertical misalignments. As noted above, for larger vergence angles (or for smaller fixation distances), the vertical fusional range of the user is larger. For larger vertical fusional ranges, display misalignments can less likely to lead to double vision. Thus, when a large vergence angle (or small fixation distance) is detected, a system may implement display misalignment corrections in a restrained (e.g., slow) manner, which can prevent the display misalignment corrections from disrupting user experiences.

Vergence angle is inversely related to the distance of the fixated object from the observer (i.e., the fixation distance). The inflection point of this non-linear relationship to fixation distance is often at about 1 m, with vergence angle rapidly increasing for fixation distances closer than about 1 m (variation across individuals exists). In some instances, when a user fixates an object that is closer than 1 m, a slow display misalignment correction can be applied in order to prevent interruption of user experience. In contrast, because vertical fusional amplitudes are smaller for smaller vergence angle (e.g., for larger fixation distances), users can be more likely to experience double vision and/or discomfort when display misalignments are present while the user focuses on distant objects. Thus, in some instances, a fast display misalignment correction can be applied when a user fixates an object that is further than 1 m from the user.

At least some disclosed techniques involve determining a vertical fusional amplitude indicator associated with operation of a stereoscopic display system (e.g., an HMD) and predicating one or more correction application attributes on the vertical fusional amplitude indicator. The correction application attribute(s) indicate a manner of applying one or more display misalignment correction operation(s) to align presentation of content in the stereoscopic display system. The display misalignment correction operation(s) are then applied in accordance with the correction application attribute(s).

At least some disclosed embodiments may advantageously tailor the application of a misalignment operation for a display system to the use context of the display system, such as the vergence angle associated with a user experience. Such functionality may provide systems that can advantageously facilitate display misalignment correction in a manner that is less disruptive to user experiences and/or in a manner that improves user comfort. Thus, disclosed systems may, in some instances, minimize or reduce the deleterious effects of display misalignment corrections.

Having just described some of the various high-level features and benefits of the disclosed embodiments, attention will now be directed to FIGS. 1 through 4. These Figures illustrate various conceptual representations, architectures, methods, and supporting illustrations related to the disclosed embodiments.

Figure 1:
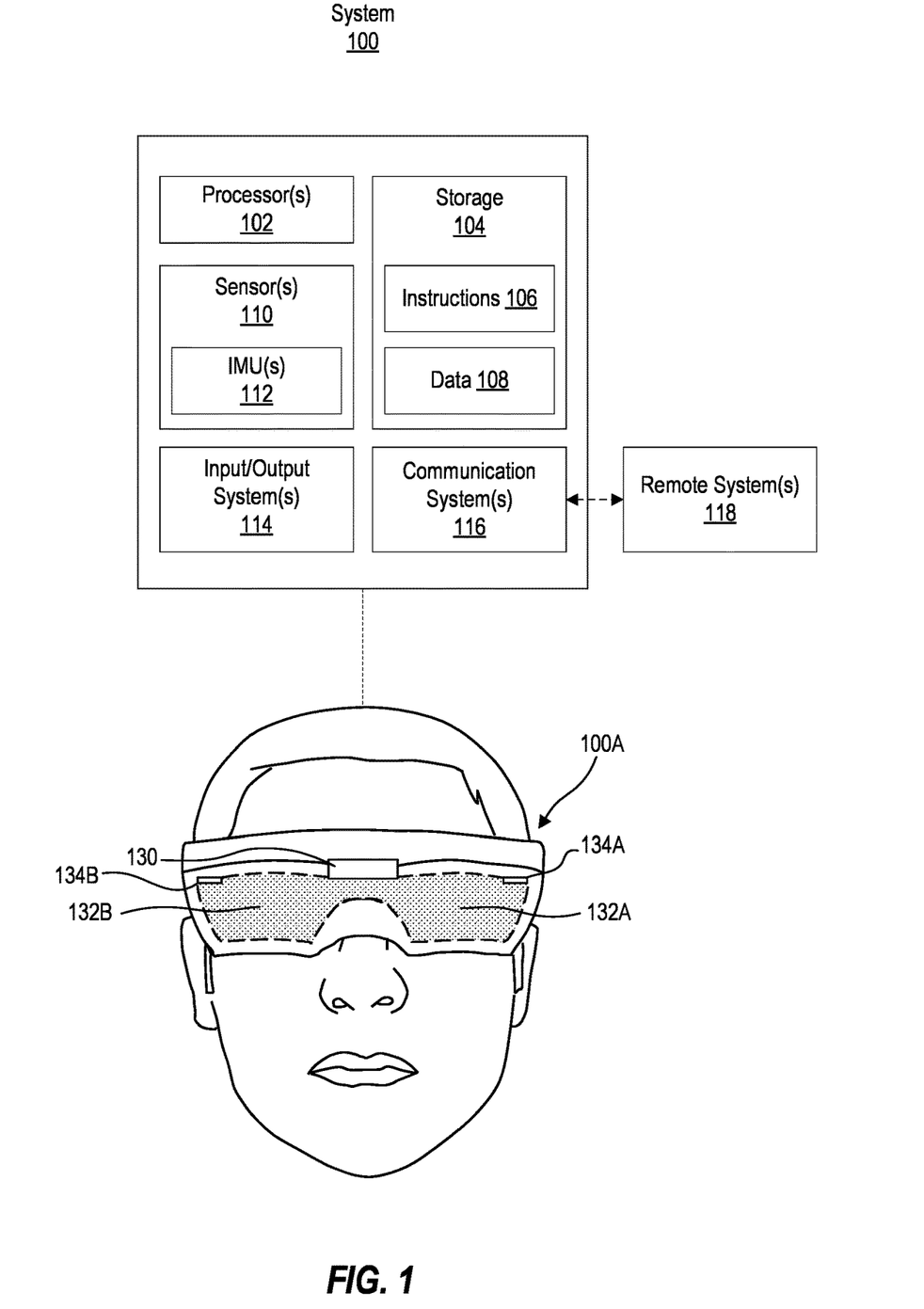
FIG. 1 illustrates example components of an example system that may include or be used to implement one or more disclosed embodiments.

Example Systems and Techniques for Facilitating Display Misalignment Correction Based on Vergence Angle FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (1/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with facilitating display misalignment corrections. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomena. By way of non-limiting example, the sensor(s) 110 may comprise one or more image sensors, eye tracking sensors, depth sensors, microphones, thermometers, barometers, magnetometers, accelerometers, gyroscopes, and/or others.

FIG. 1 illustrates that the sensor(s) 110 may comprise inertial measurement unit(s) 112 (IMU(s) 112), which may include a combination of one or more accelerometers, gyroscopes, and/or magnetometers. IMU(s) 112 may be used to track or obtain data indicating motion attributes of the system 100 (e.g., inertial tracking data), such as 3 degrees of freedom (3DOF) pose data for the system 100 (e.g., yaw, pitch, roll pose data). In some instances, inertial tracking data obtained via IMU(s) 112 is combined with visual tracking data (which may be obtained based on imagery captured utilizing one or more image sensors) to provide 6 degrees of freedom (6DOF) pose data for the system 100 (e.g., x, y, z, yaw, pitch, roll pose data), such as by performing simultaneous localization and mapping (SLAM).

Furthermore, FIG. 1 illustrates that a system 100 may comprise or be in communication with I/O system(s) 114. I/O system(s) 114 may include any type of input or output device such as, byway of non-limiting example, a touch screen, a mouse, a keyboard, a controller, a speaker, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize a head-mounted display 100A (HMD 100A). Although the present description focuses, in at least some respects, on utilizing an HMD to implement techniques of the present disclosure, additional or alternative types of systems may be used.

The HMD 100A of FIG. 1 includes separate display components for displaying images to the user's left eye and right eye. In particular, FIG. 1 depicts the HMD 100A as including display 132A configured for displaying images to the user's left eye and display 132B configured for displaying images to the user's right eye. The displays 132A and 132B of FIG. 1 may comprise surface relief grating (SRG) displays configured to out-couple light emitted by light source(s) 130 (e.g., laser scanning/projecting component s with microelectromechanical mirrors) and internally reflected toward/through the displays 132A and 132B. Other types of display devices are within the scope of the present disclosure (e.g., back-lit display panels such as LED displays, LCOS displays, etc.).

The HMD 100A may comprise one or more detectors 134A and 134B configured to detect at least a portion of the light emitted by the light source(s) 130. For instance, the one or more detectors 134A and 134B may be arranged to detect a test portion of display imagery output by the light source(s) 130, which may comprise a test pattern/image. The test pattern/image as detected by the detector(s) 134A and 134B may enable the HMD 100A to determine whether stereoscopic misalignments exist in the output of the light source(s) 130 (e.g., based upon distortions or deviations in the detected test pattern/image from an expected form of the test pattern/image). The HMD 100A may then determine appropriate misalignment correction operations to perform to correct for the detected stereoscopic misalignment (e.g., transformations configured to correct for the distortions/deviations detected in the test pattern/image as detected by the detector(s) 134A and 134B).

Figure 2A:
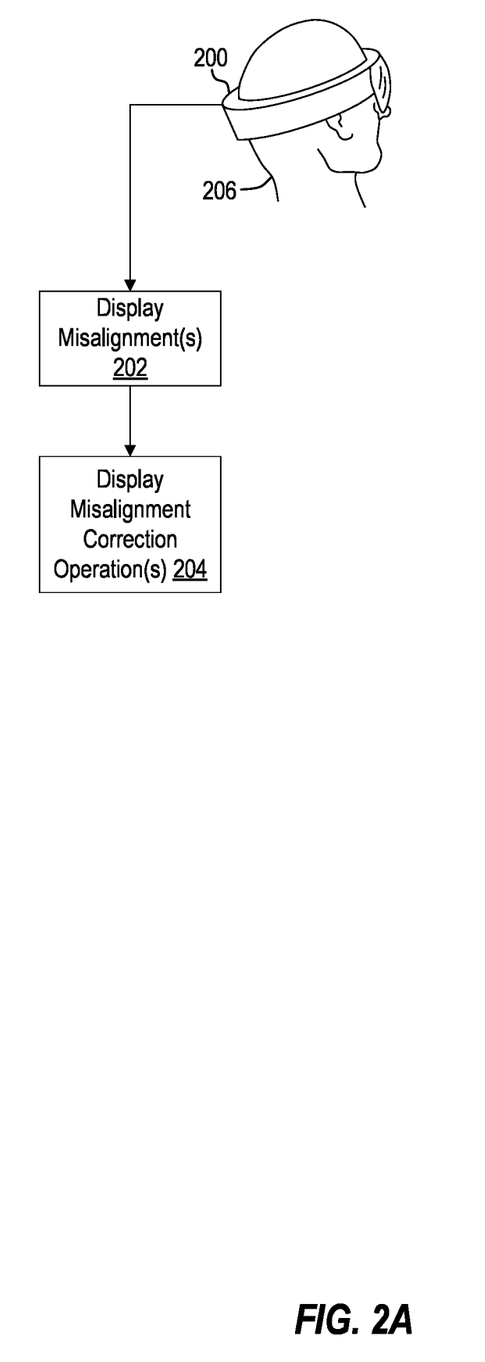
FIG. 2A illustrates a conceptual representation of display misalignments and correction operations associated with a head-mounted display (HMD)

FIG. 2A illustrates an HMD 200 (worn by a user 206), which corresponds in at least some respects to the HMD 100A discussed hereinabove with reference to FIG. 1. For instance, the HMD 200 may comprise detectors for detecting display misalignment(s) 202 between two displays for displaying content to separate eyes of a user (e.g., as discussed above). Based upon the detected display misalignment(s) 202, the HMD 200 (or any system) may determine display misalignment correction operation(s) 204 configured for correcting the display misalignment(s) 202 to restore or improve the user experience (e.g., by aligning the presentation of content as between the two displays). The display misalignment correction operation(s) 204 may comprise various components, such as a yaw component, a pitch component, and/or a roll component. A yaw component may comprise a correction configured to address errors in the distance/depth of displayed virtual objects. A pitch component may comprise a correction configured to address errors in vertical positioning of displayed virtual objects. A roll component may comprise a correction configured to address a combination of pitch and yaw misalignments based on the eccentricity of displayed virtual objects about a center of the display.

As noted above, immediately applying display misalignment correction operation(s) 204 may result in user discomfort. For example, abrupt corrections to the position of holograms/virtual objects can be disorienting, confusing, and/or unsafe for users. Accordingly, disclosed embodiments are directed to systems that enable application of display misalignment correction operation(s) 204 in a manner that can reduce user discomfort throughout the application of such corrections.

Figure 2B:
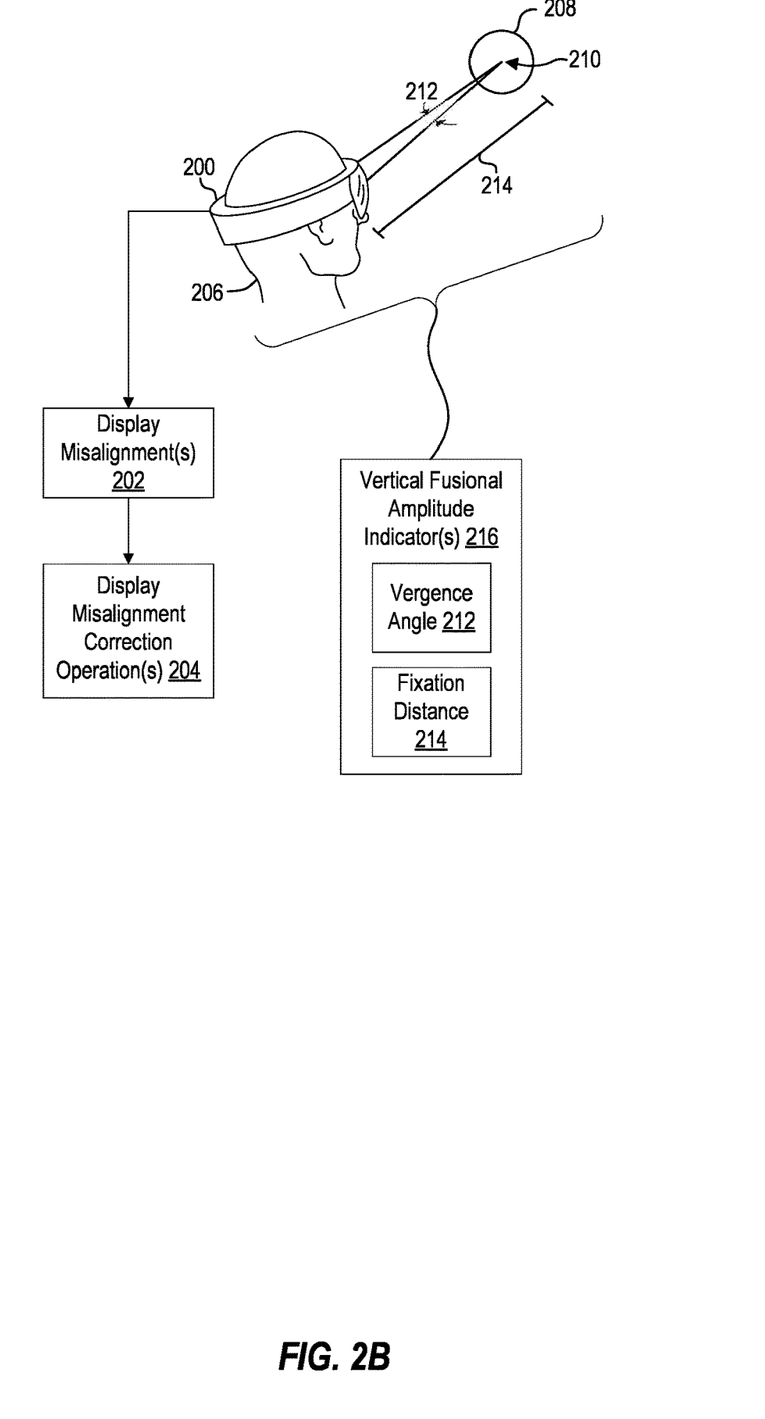
FIG. 2B illustrates a conceptual depiction of vertical fusional amplitude indicators that can be determined in association with operation of an HMD.

FIG. 2B conceptually depicts the user 206 wearing the HMD 200 visually fixating on a virtual object 208 (e.g., as part of a mixed-reality experience facilitated by the HMD 200). FIG. 2B also conceptually depicts vertical fusional amplitude indicator(s) 216. The vertical fusional amplitude indicator(s) 216 measure, approximate, or otherwise indicate the vertical fusional amplitude (or a proxy therefor) of the user 206 as the user fixates on the virtual object 208. As noted above, the vertical fusional amplitude is the range of vertical offsets/misalignments between images displayed by the HMD 200 within which the human visual system of the user 206 can still achieve image fusion. As will be described in more detail, the vertical fusional amplitude indicator(s) 216 may be utilized to influence the manner of applying the display misalignment correction operation(s) 204 to improve user comfort and/or avoid disruption of user experiences.

The vertical fusional amplitude indicator(s) 216 may take on various forms and/or may be obtained in various ways. For instance, as noted above, vergence angle is related to vertical fusional amplitude, such that larger vergence angles are associated with larger vertical fusional amplitudes, and smaller vergence angles are associated with smaller vertical fusional amplitudes. Furthermore, fixation distance (which is negatively related to vergence angle) is related to vertical fusional amplitude, such that larger fixation distances are associated with smaller vertical fusional amplitudes, and smaller fixation distances are associated with larger vertical fusional amplitudes.

Accordingly, the vertical fusional amplitude indicator(s) 216 may take the form of and/or be based upon vergence angle 212 and/or fixation distance 214. FIG. 2B illustrates a fixation point 210 on the virtual object 208, with lines extending from the eyes of the user 206 toward the fixation point 210 to depict lines of sight of the eyes of the user 206. FIG. 2B depicts a vergence angle 212 between the lines of sight extending toward the fixation point 210. FIG. 2B furthermore depicts the fixation distance 214 between the fixation point 210 and the eyes of the user 206. The positioning, orientation, and/or other attributes of the eyes of the user 206 may be measured via eye tracking sensors (e.g., sensor(s) 110), which may be used to obtain the vergence angle 212 and/or the fixation distance 214 for use as (or for use to obtain) the vertical fusional amplitude indicator(s) 216.

Other types of vertical fusional amplitude indicator(s) 216 are within the scope of the present disclosure. For example, pupil size and/or other attributes (which may be determined via eye tracking sensors) may be indicative of the fixation distance (e.g., with pupil size being negatively related to fixation distance, such that larger pupil sizes are associated with closer fixation distances, and smaller pupil sizes are associated with further fixation distances). Pupil size may therefore be utilized as an indicator of vergence angle (which, as noted above, is related to the vertical fusional amplitude indicator(s) 216). Eye tracking data may be combined with other information to determine vergence angle and/or fixation distance. For instance, inertial tracking data (e.g., obtained via IMU(s) 112) may be combined with eye tracking data for a single user eye over time to provide a vergence angle between lines of sight for the single eye at different timepoints. In some instances, fixation distance and/or vergence angle may be estimated without eye tracking data, such as by utilizing location information associated with a user and virtual objects in a virtual environment (e.g., localization and mapping data, which may indicate user positioning relative to virtual objects). Any method for estimating or determining what virtual object(s) a user is focusing on (or expected to be focusing on) may be utilized (e.g., without eye tracking) in accordance with the present disclosure (e.g., by identifying virtual object(s) the user is interacting with, facing, etc.).

Figure 2C:
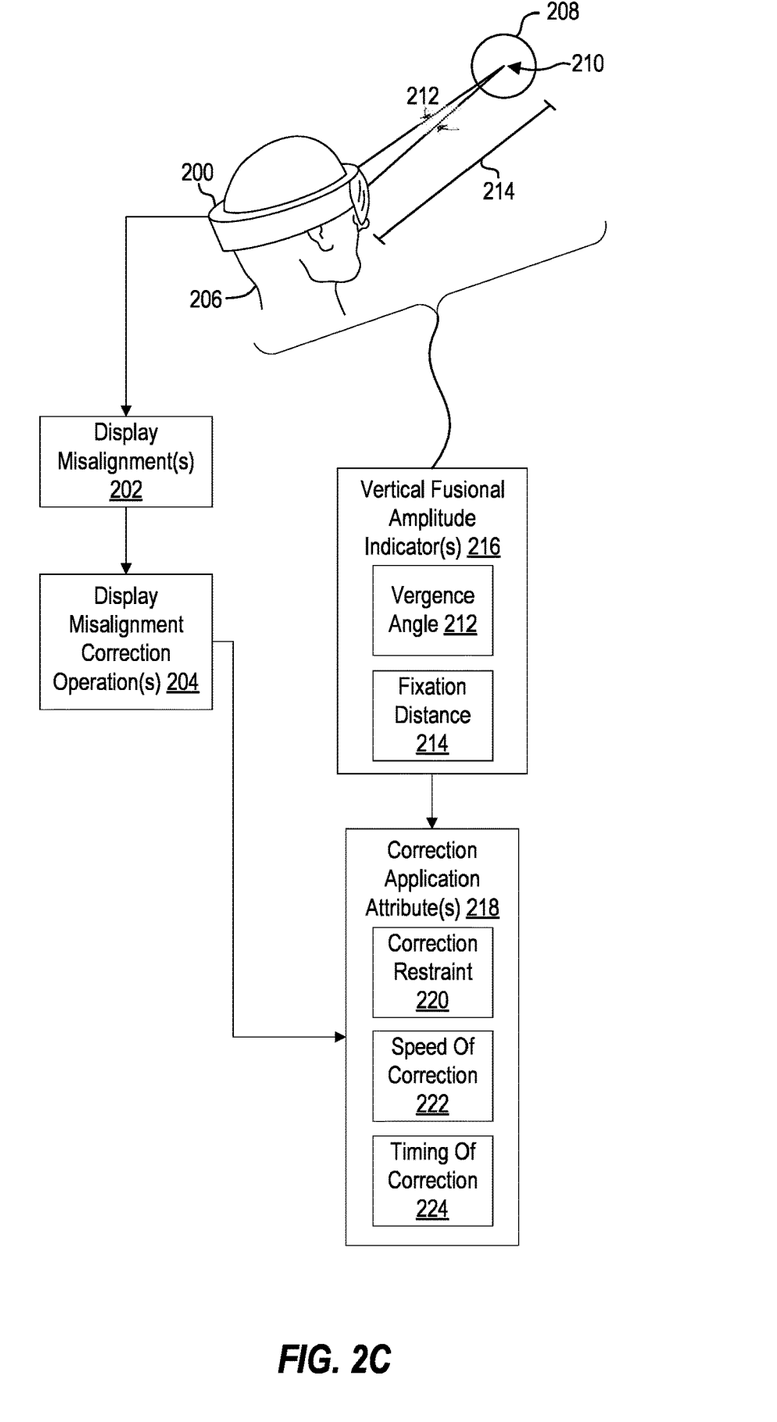
FIG. 2C illustrates a conceptual representation of correction application attributes that may be determined based upon vertical fusional amplitude indicators associated with an HMD and/or a type of display misalignment correction operation determined as beneficial for continued operation of the HMD.

The vertical fusional amplitude indicator(s) 216 associated with the operation of the HMD 200 (or other system) may provide a basis for determining a manner in which to apply misalignment corrections to render the application of such misalignment corrections less disruptive to user experiences and/or mitigate user discomfort. FIG. 2C illustrates correction application attribute(s) 218, which may define a manner of applying the display misalignment correction operation(s) 204. The correction application attribute(s) 218 may be determined based upon the vertical fusional amplitude indicator(s) 216 and/or the display misalignment correction operation(s) 204 to be performed (as indicated in FIG. 2C by the arrows extending from the vertical fusional amplitude indicator(s) 216 and the display misalignment correction operation(s) 204 to the correction application attribute(s) 218).

Correction application attribute(s) 218 may comprise various components, such as correction restraint 220, speed of correction 222, timing of correction 224, and/or others. In some instances, correction restraint 220 may comprise whether application of display misalignment correction operation(s) 204 should be substantially immediate or unrestrained (e.g., performed in a manner that overrides or refrains from giving weight to the vertical fusional amplitude indicator(s) 216) or at least partially restrained (e.g., performed in a manner that accounts for and/or gives weight to the vertical fusional amplitude indicator(s) 216). Correction restraint 220 may be determined based upon the type of display misalignment correction operation(s) 204 to be performed for display of content on the HMD 200. For instance, vertical disparities arising from misalignments in pitch can be associated with extreme user discomfort, which can increase the desirability of immediate performance of display misalignment correction operation(s) 204 with a substantial or predominant pitch component.

Thus, in some instances, the HMD 200 (or any system) is configured to select a correction restraint 220 that causes unrestrained application of the display misalignment correction operation(s) 204 when the display misalignment correction operation(s) 204 include a pitch component that satisfies one or more pitch thresholds (e.g., overriding or de-prioritizing how the vertical fusional amplitude indicator(s) 216 might otherwise influence the correction application attribute(s) 218, as described below). Put differently, systems may refrain from causing restrained application of the display misalignment correction operation(s) 204 when the display misalignment correction operation(s) 204 include a pitch component 204B that satisfies one or more pitch thresholds.

In some instances, correction restraint 220 is additionally or alternatively influenced by the vertical fusional amplitude indicator(s) 216. For instance, where the fixation distance 214 satisfies a high fixation distance threshold (e.g., meeting or exceeding a fixation distance of 1 m, or another value), the correction restraint 220 may be selected to cause unrestrained (e.g., substantially immediate, or not artificially slowed/delayed) application of the display misalignment correction operation(s) 204 (e.g., in some instances, regardless of the type or character of the display misalignment correction operation(s) 204 to be applied). Similarly, for example, where the vergence angle 212 satisfies a low vergence angle threshold (e.g., below a vergence angle associated with a 1 m fixation distance, or another value), the correction restraint 220 may be selected to cause unrestrained application of the display misalignment correction operation(s) 204.

In some implementations, systems are configured to enable restrained application of display misalignment correction operation(s) 204 based upon the vertical fusional amplitude indicator(s) 216 and/or the type or character of the display misalignment correction operation(s) 204 to be performed. For example, as noted above, correction application attribute(s) 218 may comprise speed of correction 222 and/or timing of correction 224. The speed of correction 222 may define the rapidity, rate, gradualness, or abruptness at which the display misalignment correction operation(s) 204 are applied to correct presentation of content on the HMD 200. A high speed of correction 222 may cause changes to the hologram/virtual object position/presentation to appear instantaneous or quick (e.g., presenting as a rapid shift or transformation of the hologram/virtual object), whereas a low speed of correction may cause changes to the hologram/virtual object position/presentation to appear gradual or slow (e.g., presenting as a slow shift or transformation of the hologram/virtual object).

In some instances, the speed of correction 222 is selected based upon the vertical fusional amplitude indicator(s) 216 associated with operation of the HMD 200. For example, the vergence angle 212 and the speed of correction 222 may be negatively related, such that an increased speed of correction 222 is selected responsive to a detected low vergence angle 212, and a decreased speed of correction 222 is selected responsive to a detected high vergence angle 212. High vergence angles can result in large vertical fusional amplitudes for user human vision systems, providing an opportunity to perform gradual display misalignment corrections to avoid disrupting user experiences (e.g., with jarring shifts in virtual object positioning). In contrast, low vergence angles can result in small vertical fusional amplitudes for user human vision systems, which can result in the inability of users to fuse misaligned images (e.g., causing user discomfort). In such instances, systems may perform fast display misalignment corrections to mitigate user discomfort.

Along these lines, the fixation distance 214 and the speed of correction 222 may be positively related, such that an increased speed of correction 222 is selected responsive to a detected high fixation distance 214, and a decreased speed of correction 222 is selected responsive to a detected low fixation distance 214. Small fixation distances can result in large vertical fusional amplitudes for user human vision systems, providing an opportunity to perform gradual display misalignment corrections to avoid disrupting user experiences (e.g., with jarring shifts in virtual object positioning). In contrast, large fixation distances can result in small vertical fusional amplitudes for user human vision systems, which can result in the inability of users to fuse misaligned images (e.g., causing user discomfort). In such instances, systems may perform fast display misalignment corrections to mitigate user discomfort.

The relationship between the speed of correction 222 and the vertical fusional amplitude indicator(s) 216 (e.g., vergence angle 212, fixation distance 214, pupil size, and/or others) may be defined in any suitable manner, such as by a linear or other function, by a set of thresholds (e.g., threshold vertical fusional amplitude indicator(s) 216 being associated with corresponding, respective speeds of correction 222), etc.

Modifying the speed of correction 222 based upon the vertical fusional amplitude indicator(s) 216 may be beneficial for at least some types of display misalignment correction operation(s) 204. For example, when the display misalignment correction operation(s) 204 include or are predominated by a yaw component (and/or when the pitch component is sufficiently small) and vertical fusional amplitude indicator(s) 216 indicate a low vertical fusional amplitude, a low speed of correction 222 may be selected to prevent user distraction caused by abrupt changes to virtual object presentation. In contrast, when the display misalignment correction operation(s) 204 include or are predominated by a yaw component (and/or when the pitch component is sufficiently small) and the vertical fusional amplitude indicator(s) 216 indicate a high vertical fusional amplitude, a high speed of correction 222 may still be selected to avoid or reduce motion-related artifacts such as swim or hologram/virtual object instability, thereby enable fast-locking of holograms/virtual objects.

In some instances, the speed of correction 222 is selectively modified on the basis of the vertical fusional amplitude indicator(s) 216 as discussed above in response to detection that the display misalignment correction operation(s) 204 includes a pitch component that fails to satisfy one or more pitch thresholds (e.g., a threshold for causing unrestrained or substantially immediate application of the display misalignment correction operation(s) 204). In at least some other instances, such as where the pitch component satisfies the pitch threshold(s), a system overrides the vertical fusional amplitude indicator(s) 216 when selecting the speed of correction 222 (e.g., to implement a fast correction, even when a high vertical fusional amplitude is indicated).

Pitch threshold(s) may encompass vertical display misalignments that exceed estimated vertical fusional amplitude based on the vertical fusional amplitude indicator(s) 216. For example, a system may compute vertical fusional amplitude based upon the vertical fusional amplitude indicator(s) 216 and compare the computed vertical fusional amplitude to the vertical offset (e.g., pitch component) associated with the display misalignment(s) 202 that the display misalignment correction operation(s) 204 are intended to correct. In response to determining that the computed vertical fusional amplitude exceeds the vertical offset, a speed of correction 222 associated with a slow correction may be implemented, whereas, in response to determining that the computed vertical fusional amplitude fails to exceed the vertical offset, a speed of correction 222 associated with a fast correction may be implemented.

In some instances, a system may selectively refrain from applying display misalignment correction operation(s) 204 until threshold vertical fusional amplitude indicator(s) 216 are satisfied. For example, when the display misalignment correction operation(s) 204 omit a pitch component (or include a sufficiently low pitch component), a system may abstain from applying the display misalignment correction (e.g., thereby modifying the timing of correction 224) until a threshold vertical fusional amplitude indicator is detected for the system (e.g., the HMD 200).

One will appreciate, in view of the present disclosure, that the vertical fusional amplitude indicator(s) 216 and the nature or character of the display misalignment correction operation(s) 204 to be applied may be used individually or in combination to determine the correction application attribute(s) 218 that will be used to apply the display misalignment correction operation(s) 204 to modify the display of content on the HMD 200 (or other system). Furthermore, one will appreciate, in view of the present disclosure, that any number of correction application attribute(s) 218 may be determined and/or used in various implementations of the disclosed principles. For example, a correction restraint 220 may comprise an initially determined attribute, which, if selected to enable restrained application of the display misalignment correction operation(s) 204, may lead to selection of an appropriate speed of correction 222 and/or timing of correction 224.

Figure 2D:
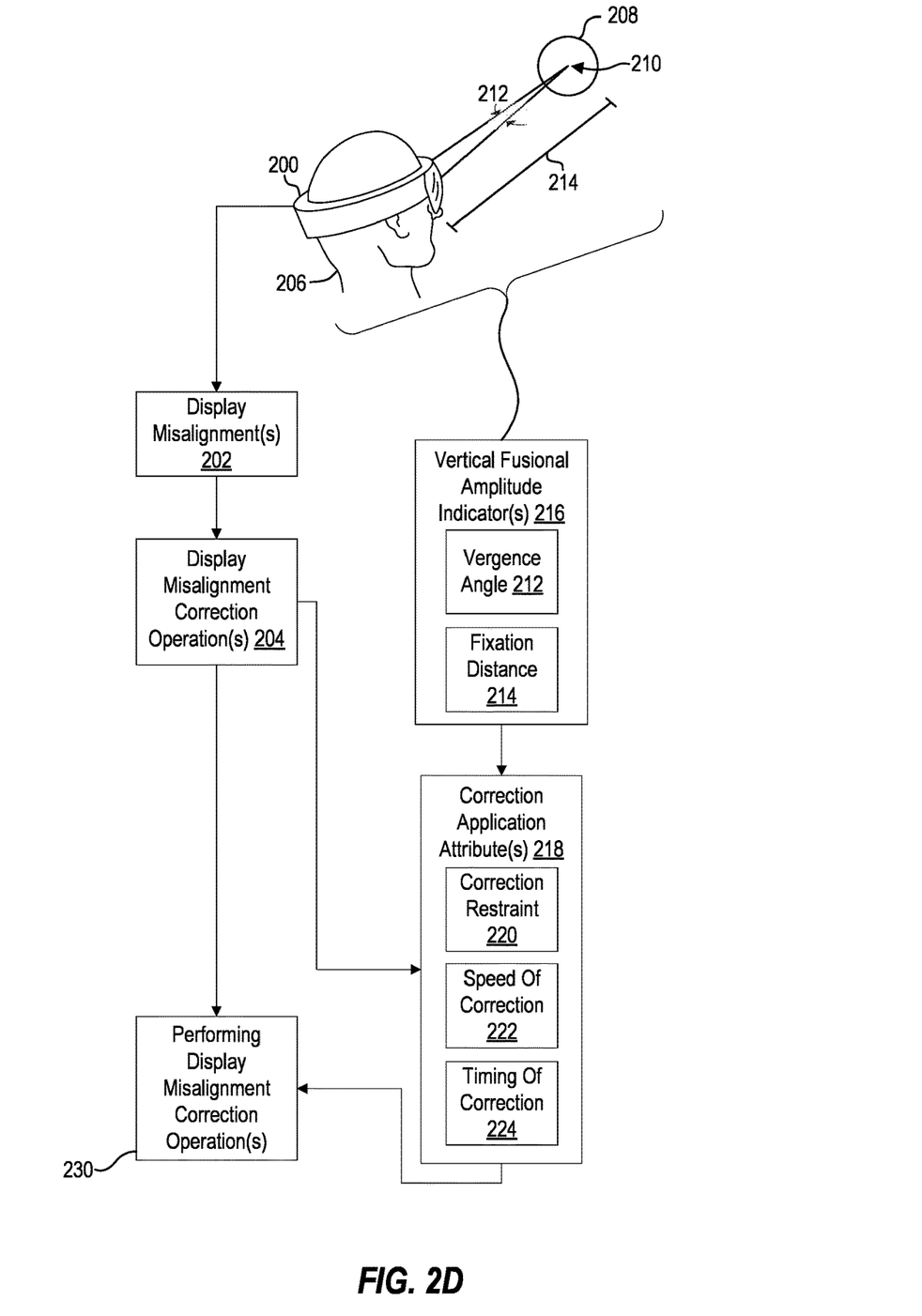
FIG. 2D illustrates a conceptual representation of performing a display misalignment correction operation based upon correction application attributes.

FIG. 2D illustrates action block 230, which conceptually represents performing display misalignment correction operation(s) 204 in accordance with the correction application attribute(s) 218 (e.g., represented by the arrows extending from the display misalignment correction operation(s) 204 and the correction application attribute(s) 218 to action block 230 in FIG. 2D). By utilizing dynamically determined correction application attribute(s) 218 (e.g., based upon vertical fusional amplitude indicator(s) 216 and/or the nature or character of the display misalignment correction operation(s) 204 to be performed) to apply display misalignment correction operation(s) 204, systems of the present disclosure may implement stereoscopic display misalignment correction functionality in a manner that advantageously reduces or avoids disruption to user experiences caused by the correction operations themselves.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 3:
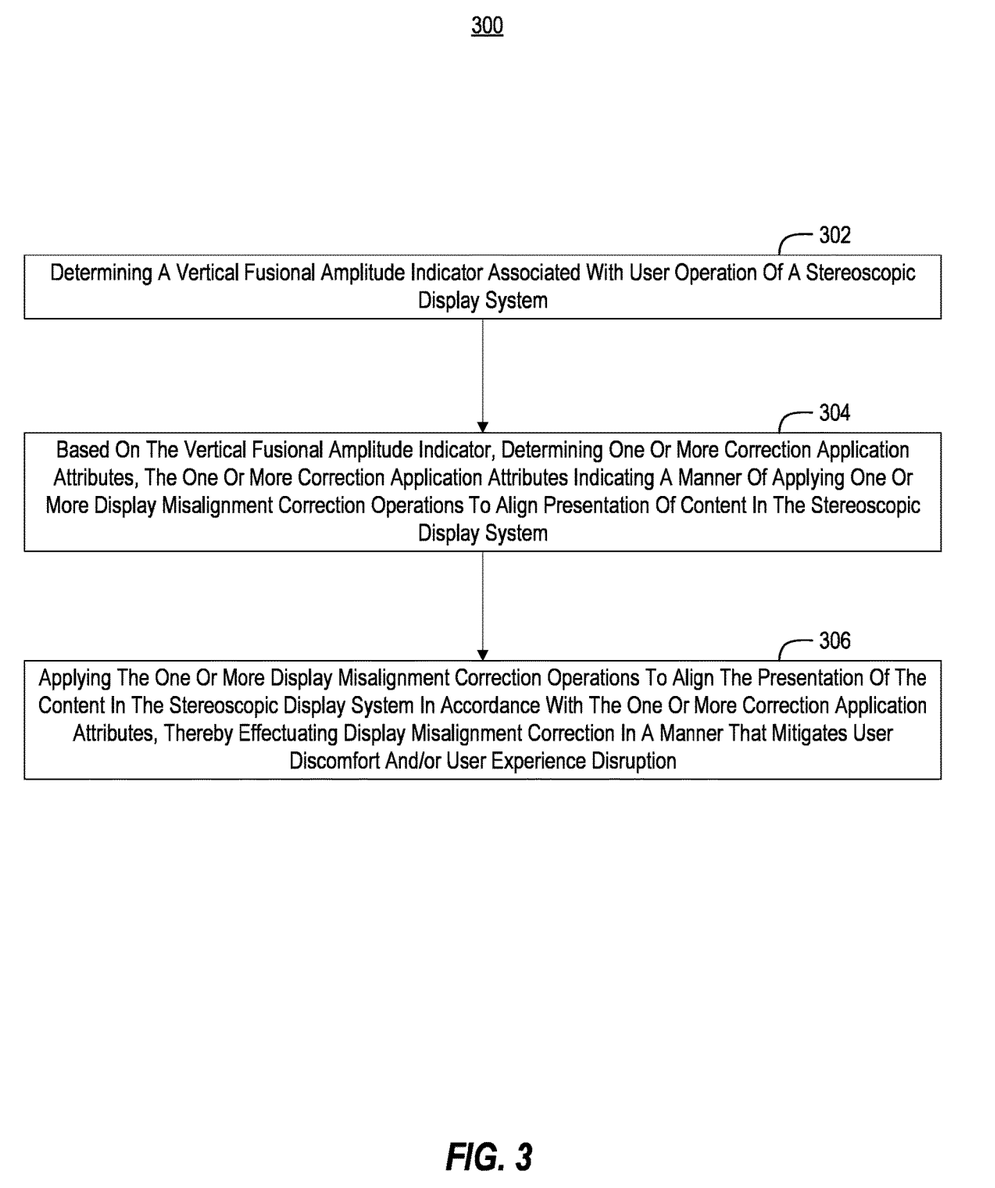
FIGS. 3 and 4 illustrate example flow diagrams depicting acts associated with facilitating display misalignment correction based on vergence angle, in accordance with implementations of the present disclosure.
Figure 4:
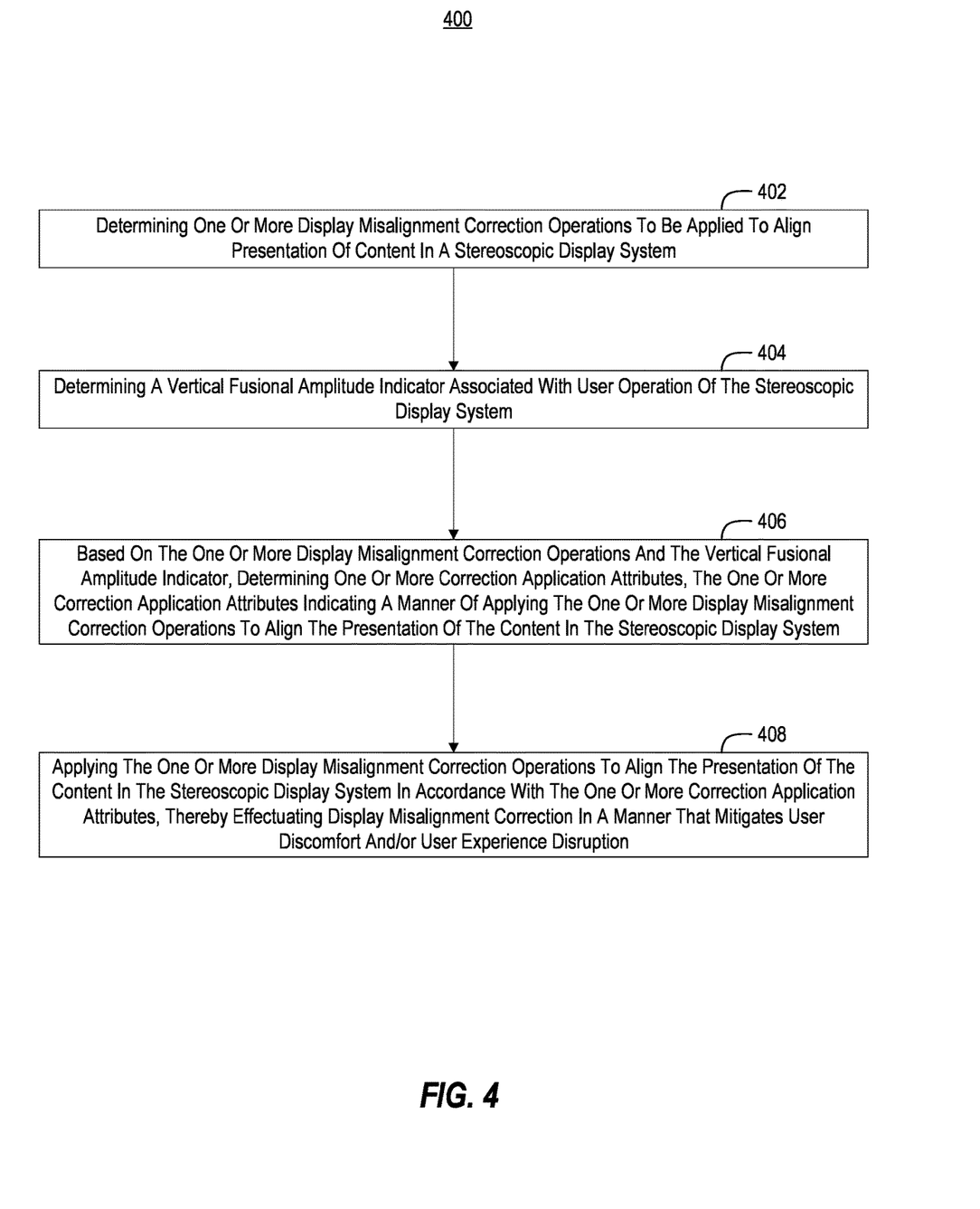

FIGS. 3 and 4 illustrate example flow diagrams 300 and 400, respectively, depicting acts associated with facilitating display misalignment correction based on vergence angle, in accordance with implementations of the present disclosure.

Act 302 of flow diagram 300 of FIG. 3 includes determining a vertical fusional amplitude indicator associated with user operation of a stereoscopic display system. Act 302 is performed, in some instances, utilizing one or more components of a system 100, such as processor(s) 102, storage 104, sensor(s) 110, I/O system(s) 114, communication system(s) 116, and/or other components. In some implementations, the vertical fusional amplitude indicator comprises a vergence angle or fixation distance based upon eye tracking data. In some instances, the vertical fusional amplitude indicator is further based upon inertial tracking data. In some implementations, the vertical fusional amplitude indicator is based on location information associated with a user and one or more virtual objects in a virtual environment.

Act 304 of flow diagram 300 includes, based on the vertical fusional amplitude indicator, determining one or more correction application attributes, the one or more correction application attributes indicating a manner of applying one or more display misalignment correction operations to align presentation of content in the stereoscopic display system. Act 304 is performed, in some instances, utilizing one or more components of a system 100, such as processor(s) 102, storage 104, sensor(s) 110, I/O system(s) 114, communication system(s) 116, and/or other components. In some implementations, the one or more correction application attributes comprise a speed of correction. In some instances, the vergence angle and the speed of correction are negatively related. In some instances, the fixation distance and the speed of correction are positively related.

In some implementations, determining the vertical fusional amplitude indicator comprises (i) determining whether the vergence angle satisfies one or more vergence angle thresholds or (ii) determining whether the fixation distance satisfies one or more fixation distance thresholds. In some instances, determining the one or more correction application attributes comprises selecting the speed of correction from a plurality of speeds of correction based upon (i) the one or more vergence angle thresholds satisfied by the vergence angle or (ii) the one or more fixation distance thresholds satisfied by the fixation distance. In some implementations, the plurality of speeds of correction and the one or more vergence angle thresholds are negatively related. In some instances, the plurality of speeds of correction and the one or more fixation distance thresholds are positively related.

In some implementations, determining the one or more correction application attributes is further based upon the one or more display misalignment correction operations to be applied. In some instances, the one or more display misalignment correction operations comprise a pitch component. In some implementations, in response to determining that the pitch component satisfies one or more pitch thresholds, the one or more correction application attributes cause unrestrained application of the one or more display misalignment correction operations. In some instances, in response to determining that the pitch component satisfies the one or more pitch thresholds, the one or more correction application attributes refrain from causing restrained application of the one or more display misalignment correction operations based upon the vertical fusional amplitude indicator. In some instances, in response to determining that the pitch component fails to satisfy one or more pitch thresholds, the one or more correction application attributes cause restrained application of the one or more display misalignment correction operations based upon the vertical fusional amplitude indicator. In some instances, in response to determining that the pitch component fails to satisfy one or more pitch thresholds, the one or more correction application attributes cause abstention of applying the one or more display misalignment correction operations until a vergence angle indicated by the vertical fusional amplitude indicator satisfies one or more vergence angle thresholds.

Act 306 of flow diagram 300 includes applying the one or more display misalignment correction operations to align the presentation of the content in the stereoscopic display system in accordance with the one or more correction application attributes, thereby effectuating display misalignment correction in a manner that mitigates user discomfort and/or user experience disruption. Act 306 is performed, in some instances, utilizing one or more components of a system 100, such as processor(s) 102, storage 104, sensor(s) 110, I/O system(s) 114, communication system(s) 116, and/or other components.

Act 402 of flow diagram 400 of FIG. 4 includes determining one or more display misalignment correction operations to be applied to align presentation of content in a stereoscopic display system. Act 402 is performed, in some instances, utilizing one or more components of a system 100, such as processor(s) 102, storage 104, sensor(s) 110, I/O system(s) 114, communication system(s) 116, and/or other components.

Act 404 of flow diagram 400 includes determining a vertical fusional amplitude indicator associated with user operation of the stereoscopic display system. Act 404 is performed, in some instances, utilizing one or more components of a system 100, such as processor(s) 102, storage 104, sensor(s) 110, I/O system(s) 114, communication system(s) 116, and/or other components.

Act 406 of flow diagram 400 includes, based on the one or more display misalignment correction operations and the vertical fusional amplitude indicator, determining one or more correction application attributes, the one or more correction application attributes indicating a manner of applying the one or more display misalignment correction operations to align the presentation of the content in the stereoscopic display system. Act 406 is performed, in some instances, utilizing one or more components of a system 100, such as processor(s) 102, storage 104, sensor(s) 110, I/O system(s) 114, communication system(s) 116, and/or other components. In some implementations, the one or more display misalignment correction operations comprise a pitch component. In some instances, in response to determining that the pitch component satisfies one or more pitch thresholds, the one or more correction application attributes cause unrestrained application of the one or more display misalignment correction operations, regardless of a vergence angle indicated by the vertical fusional amplitude indicator associated with operation of the stereoscopic display system.

Act 408 of flow diagram 400 includes applying the one or more display misalignment correction operations to align the presentation of the content in the stereoscopic display system in accordance with the one or more correction application attributes, thereby effectuating display misalignment correction in a manner that mitigates user discomfort and/or user experience disruption. Act 406 is performed, in some instances, utilizing one or more components of a system 100, such as processor(s) 102, storage 104, sensor(s) 110, I/O system(s) 114, communication system(s) 116, and/or other components.

Additional Details Related to Computing Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for facilitating display misalignment correction based on vergence angle, comprising:
   one or more processors; and
   one or more hardware storage devices storing instructions that are executable by the one or more processors to configure the system to:
      obtain eye tracking data associated with user operation of a stereoscopic display system;
      determine a vertical fusional amplitude indicator based on the eye tracking data;
      based on the vertical fusional amplitude indicator, determine one or more correction application attributes, the one or more correction application attributes indicating a manner of applying one or more display misalignment correction operations to align presentation of content in the stereoscopic display system; and
      apply the one or more display misalignment correction operations to align the presentation of the content in the stereoscopic display system in accordance with the one or more correction application attributes, thereby effectuating display misalignment correction in a manner that mitigates user discomfort and/or user experience disruption.

2. The system of claim 1, wherein the vertical fusional amplitude indicator comprises a vergence angle or fixation distance based upon the eye tracking data.

3. The system of claim 2, wherein the vertical fusional amplitude indicator is further based upon inertial tracking data.

4. The system of claim 1, wherein the vertical fusional amplitude indicator is based on location information associated with a user and one or more virtual objects in a virtual environment.

5. The system of claim 2, wherein the one or more correction application attributes comprise a speed of correction.

6. The system of claim 5, wherein the vergence angle and the speed of correction are negatively related, or wherein the fixation distance and the speed of correction are positively related.

7. The system of claim 5, wherein determining the vertical fusional amplitude indicator comprises (i) determining whether the vergence angle satisfies one or more vergence angle thresholds or (ii) determining whether the fixation distance satisfies one or more fixation distance thresholds.

8. The system of claim 7, wherein determining the one or more correction application attributes comprises selecting the speed of correction from a plurality of speeds of correction based upon (i) the one or more vergence angle thresholds satisfied by the vergence angle or (ii) the one or more fixation distance thresholds satisfied by the fixation distance.

9. The system of claim 8, wherein the plurality of speeds of correction and the one or more vergence angle thresholds are negatively related, or wherein the plurality of speeds of correction and the one or more fixation distance thresholds are positively related.

10. The system of claim 1, wherein the instructions are executable by the one or more processors to configure the system to:
   determine the one or more display misalignment correction operations to be applied to align the presentation of the content in the stereoscopic display system.

11. The system of claim 10, wherein determining the one or more correction application attributes is further based upon the one or more display misalignment correction operations to be applied.

12. The system of claim 11, wherein the one or more display misalignment correction operations comprise a pitch component.

13. The system of claim 12, wherein, in response to determining that the pitch component satisfies one or more pitch thresholds, the one or more correction application attributes cause unrestrained application of the one or more display misalignment correction operations.

14. The system of claim 13, wherein, in response to determining that the pitch component satisfies the one or more pitch thresholds, the one or more correction application attributes refrain from causing restrained application of the one or more display misalignment correction operations based upon the vertical fusional amplitude indicator.

15. The system of claim 12, wherein, in response to determining that the pitch component fails to satisfy one or more pitch thresholds, the one or more correction application attributes cause restrained application of the one or more display misalignment correction operations based upon the vertical fusional amplitude indicator.

16. The system of claim 12, wherein, in response to determining that the pitch component fails to satisfy one or more pitch thresholds, the one or more correction application attributes cause abstention of applying the one or more display misalignment correction operations until a vergence angle indicated by the vertical fusional amplitude indicator satisfies one or more vergence angle thresholds.

17. The system of claim 1, wherein the system comprises the stereoscopic display system.

18. A system for facilitating display misalignment correction based on vergence angle, comprising:
   one or more processors; and
   one or more hardware storage devices storing instructions that are executable by the one or more processors to configure the system to:
      determine one or more display misalignment correction operations to be applied to align presentation of content in a stereoscopic display system;
      obtain eye tracking data associated with user operation of the stereoscopic display system;
      determine a vertical fusional amplitude indicator based on the eye tracking data;

based on the one or more display misalignment correction operations and the vertical fusional amplitude indicator, determine one or more correction application attributes, the one or more correction application attributes indicating a manner of applying the one or more display misalignment correction operations to align the presentation of the content in the stereoscopic display system; and apply the one or more display misalignment correction operations to align the presentation of the content in the stereoscopic display system in accordance with the one or more correction application attributes, thereby effectuating display misalignment correction in a manner that mitigates user discomfort and/or user experience disruption.

19. The system of claim 18, wherein the one or more display misalignment correction operations comprise a pitch component, and wherein, in response to determining that the pitch component satisfies one or more pitch thresholds, the one or more correction application attributes cause unrestrained application of the one or more display misalignment correction operations, regardless of a vergence angle indicated by the vertical fusional amplitude indicator associated with operation of the stereoscopic display system.

20. A method for facilitating display misalignment correction based on vergence angle, comprising:

obtaining eye tracking data associated with user operation of a stereoscopic display system;

determining a vertical fusional amplitude indicator based on the eye tracking data;

based on the vertical fusional amplitude indicator, determining one or more correction application attributes, the one or more correction application attributes indicating a manner of applying one or more display misalignment correction operations to align presentation of content in the stereoscopic display system; and applying the one or more display misalignment correction operations to align the presentation of the content in the stereoscopic display system in accordance with the one or more correction application attributes, thereby effectuating display misalignment correction in a manner that mitigates user discomfort and/or user experience disruption.

\* \* \* \* \*